(No Model.)
T. B. JEFFERY.
WHEEL TIRE.
No. 523,314.  Patented July 17, 1894.
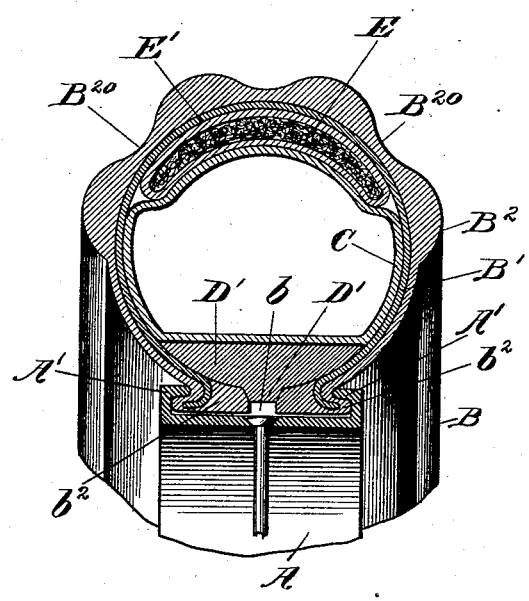

UNITED STATES PATENT OFFICE.

THOMAS B. JEFFERY, OF CHICAGO, ILLINOIS, ASSIGNOR TO THE GORMULLY & JEFFERY MANUFACTURING COMPANY, OF SAME PLACE.

WHEEL-TIRE.

SPECIFICATION forming part of Letters Patent No. 523,314, dated July 17, 1894.

Application filed January 16, 1892. Serial No. 418,234. (No model.)

*To all whom it may concern:*

Be it known that I, THOMAS B. JEFFERY, a citizen of the United States, residing at Chicago, county of Cook, and State of Illinois, have invented certain new and useful Improvements in Wheel-Tires, which are fully set forth in the following specification, reference being had to the accompanying drawing, forming a part thereof.

In the drawing, the figure is a transverse section of a wheel rim and tire therein embodying my improvements, the tire being shown fully inflated.

One feature of this invention relates to means for causing the inflation of the tire to operate upon the fastenings of the tire to the rim to cause it to be securely held, and, at the same time, permit it to be readily released when the tire or core therein is collapsed or uninflated.

Another feature of the invention relates to means for preventing the puncture of the inflatable core by sharp substances which may pierce the tread; and the third feature of this invention relates to the particular form of a corrugated tread for a tire, corrugations being employed to increase the flexibility and at the same time, the grip of the tire on the pavement, and the particular form which I have chosen being adapted to avoid the danger of cracking between the corrugations, and also of holding soil between them, which is experienced in case of other forms of corrugated tires.

A is the rim of the wheel.

B is the tire sheath or outer envelope, which may or may not have an interior independent inflatable core, but which I have illustrated as provided with such inflatable core C. The sheath is preferably made with an interior lining of textile fabric B', and an exterior covering of rubber $B^2$, which comprises the corrugated tread $B^{20}$. It is circumferentially rifted at the inner side, said rift $b$ being intermediate two lateral flanges $b^2$ $b^2$, which are adapted to engage under the overhanging lateral flanges A' A' of the rim A, the rift $b$ being, however, necessarily spread, in order that the flanges $b^2$ may enter the recesses under the overhanging flanges A' of the rim.

D is a ring located within the cavity of the tire sheath B, and provided with a rib D', adapted to enter the rift $b$, and when fully inserted thereinto, to spread said rift far enough to force the flanges $b^2$ into their respective seats in the rim. This ring D may, therefore, be termed a "key" to lock the sheath to the rim. If the tire cavity is directly inflated, the air pressure produced therein will tend to seat the ring D in the rift of the tire, and force its rib D' thereinto, as seen in Fig. 1; and when the tire is collapsed, so that it may be readily squeezed together, such manipulation will withdraw the ring and its rib D' from the rift, and permit the tire to be disengaged readily from the rim.

Preferably, the core C is employed within the sheath, and the sheath is inflated by inflating the core until it fills the cavity of the sheath. When this construction, which is the customary one, is employed, it is convenient to secure the ring D to the inner side of the core C, so that the inflation of the core will cause the latter to seat the ring, and when the core is collapsed or inflated, the tire being pinched together by the hand, the core within will be grasped, and, by means of it, the ring may be pulled out of the rift and the tire thereby unlocked from the rim. The ring D is preferably of soft rubber sufficiently flexible to be manipulated as necessary to perform the operations above described.

It is desirable, for certain reasons, that the core, when one is employed, should be somewhat longer normally than the circumference to which it is confined in the sheath, so that it may be somewhat compressed longitudinally or circumferentially, rather than, and as a precaution against, being stretched by the inflation so as to be easily pierced. If the core is simply made long and crowded into the cavity of the sheath, it is liable to be unequally compressed so that some portions of its length shall not be compressed at all, or may be even stretched, while others are unduly or unnecessarily compressed, and thereby wrinkled.

The use of the ring D, as a base for the core, is a convenient means for rendering the compression or "fullness" of the core uniform throughout its circumference, said core and ring being secured together and cemented before they are put into the sheath, and the "fullness" being in that manner easily distributed equally.

I prefer to protect the inflatable core C over the tread portion by means of the pad E. The envelope E' of this pad is preferably of textile fabric, and it is filled with any light material suitable for stuffing, as hair, moss or fiber of any sort in similar condition, or cork. If filled with hair or fiber of any sort, it is stuffed more or less tightly, but preferably, it should be stuffed sufficiently tight so that the stuffing will not be liable to become displaced in travel. The purpose of this pad is to prevent puncture, of the inflatable core which otherwise is liable to occur, from sharp stones or glass or other substance liable to be upon a road-way, and the thickness of the pad should be only sufficient to serve this purpose, and therefore, need not be over three-eighths of an inch in any ordinary tire. (This pad E is not claimed in this application, being made the subject of a divisional application filed February 17, 1894, Serial No. 500,565.)

The tread $B^{20}$, I prefer to make corrugated for greater security against slipping, and also greater flexibility. When corrugated so that the surface is formed in convex curves which meet at sharp angles, as is the customary form, the rubber is liable to crack at the lines of junction of the successive corrugations or ribs, and especially, the sharp angles retain gravel and dirt, so that the tire is liable to become filled up and lose the benefit of its corrugated form, and besides, sharp sand being thus held between the corrugations, eventually works through the tread by its alternate relaxation and compression in travel, and so cuts it and gains access to the interior core, which, in the absence of a protecting pad, is liable to be penetrated by the sharp grain of the sand, thus introduced between the sheath and the core. These defects are overcome by using a tread with corrugations of the form shown in the drawings, consisting of convex ribs or ridges with rounded concave valleys between them. If transverse corrugations are employed, the same rounded character should be given to the alternate valleys. This form of tread is adapted to be flattened out without danger of breaking when the wheel is run without inflation, and in that case, the pad E becomes of an especial additional advantage in that it makes a partial cushion to relieve the shock, and also saves the core to some extent the wear to which it would otherwise be exposed in riding the wheel uninflated.

I claim—

1. In combination with an inflatable tire circumferentially rifted at the inner side, and the wheel rim in which it is seated and to which it is detachably secured at two lines on opposite sides of the rift; a ring located within the tire cavity, and provided with a rib which protudes into the rift and is adapted to spread it to the limit permitted by the lateral fastenings: substantially as set forth.

2. In combination with an inflatable tire circumferentially rifted at its inner side and provided with flanges projecting laterally from opposite sides of the rift; the wheel rim in which said tire is seated provided with lateral overhanging flanges forming cavities adapted to receive the lateral flanges of the tire; and a ring located within the tire cavity and provided with a rib which protrudes into the rift and is adapted to spread the rift and force the tire apart into engagement with the rim: substantially as set forth.

3. In combination with a tire sheath circumferentially rifted at its inner side, and the wheel rim in which it is seated and to which it is detachably secured on opposite sides of the rift, an inflatable core within the tire cavity, and a ring also within the tire cavity at the inner side of the core, and provided with a rib adapted to protrude into the rift of the sheath and spread the rift to the limit permitted by the lateral fastenings of the same to the rim, whereby the inflation of the core tends to force the rib into the rift, as stated, to lock the tire to the rim: substantially as set forth.

4. In combination with a tire sheath circumferentially rifted at its inner side and the wheel rim in which it is seated and to which it is detachably secured at two lines on opposite sides of the rift; the inflatable core located within the sheath, and the ring D, secured to the inner side of such core and provided with a rib adapted to protrude into the rift of the sheath to spread the same and lock the tire to the rim; whereby the inflation of the core effects such locking and said ring is adapted to be pulled out of the rift by grasping the core when it is uninflated: substantially as set forth.

5. In an inflatable tire, the inflatable core therein having joined to its inner periphery a band or ring whose exterior circumference is normally less than the normal interior circumference of the core, whereby the core may be contracted or compressed: substantially as set forth.

Chicago, Illinois, January 14, 1892.

THOS. B. JEFFERY.

Witnesses:
 CHAS. S. BURTON,
 JEAN ELLIOTT.